April 11, 1950     W. T. CALDWELL     2,503,469
VALVE AND OPERATING MECHANISM THEREFOR
Original Filed March 19, 1942     2 Sheets-Sheet 1
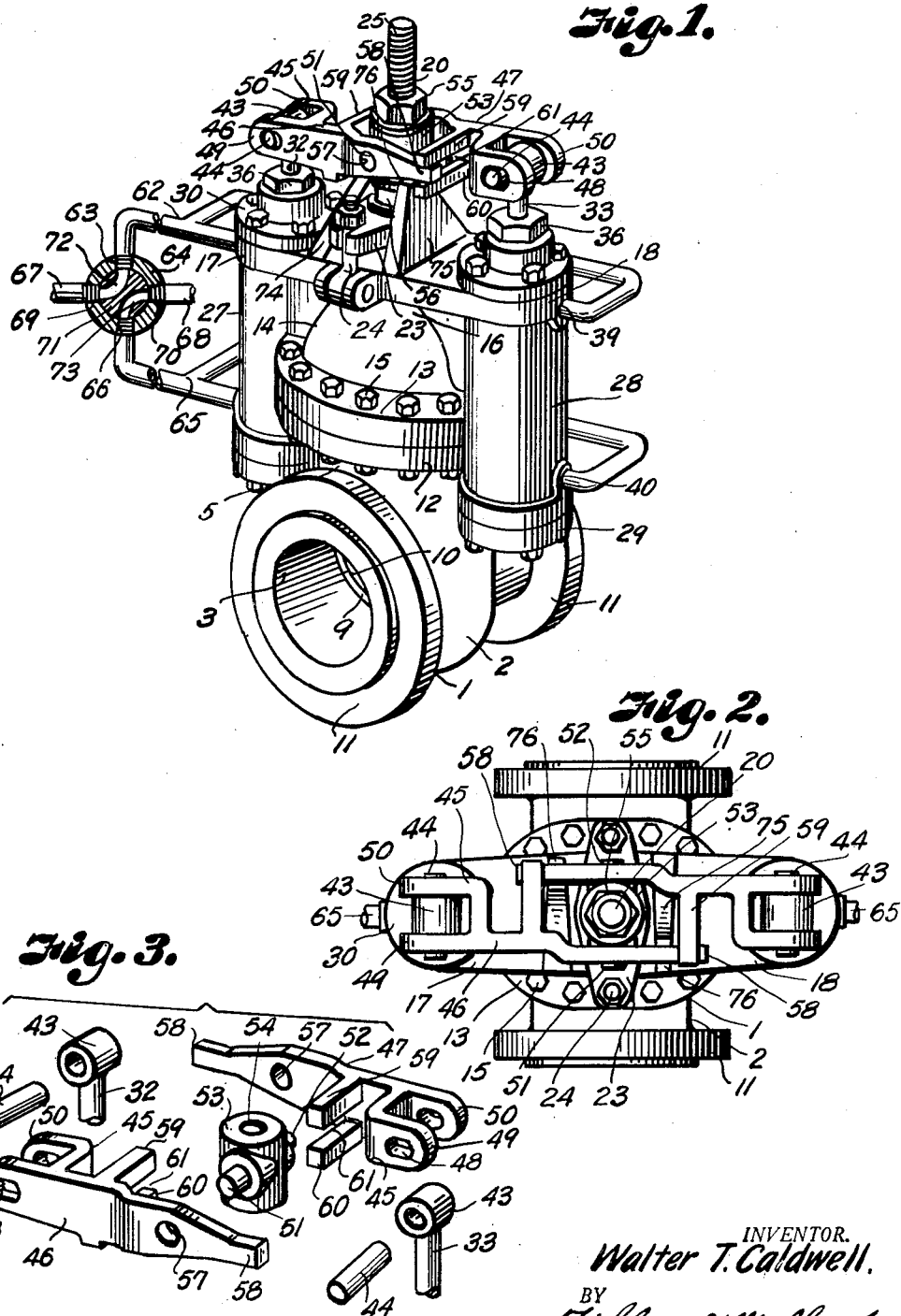
INVENTOR.
Walter T. Caldwell.
BY
Fishburn & Mullendore
ATTORNEYS.

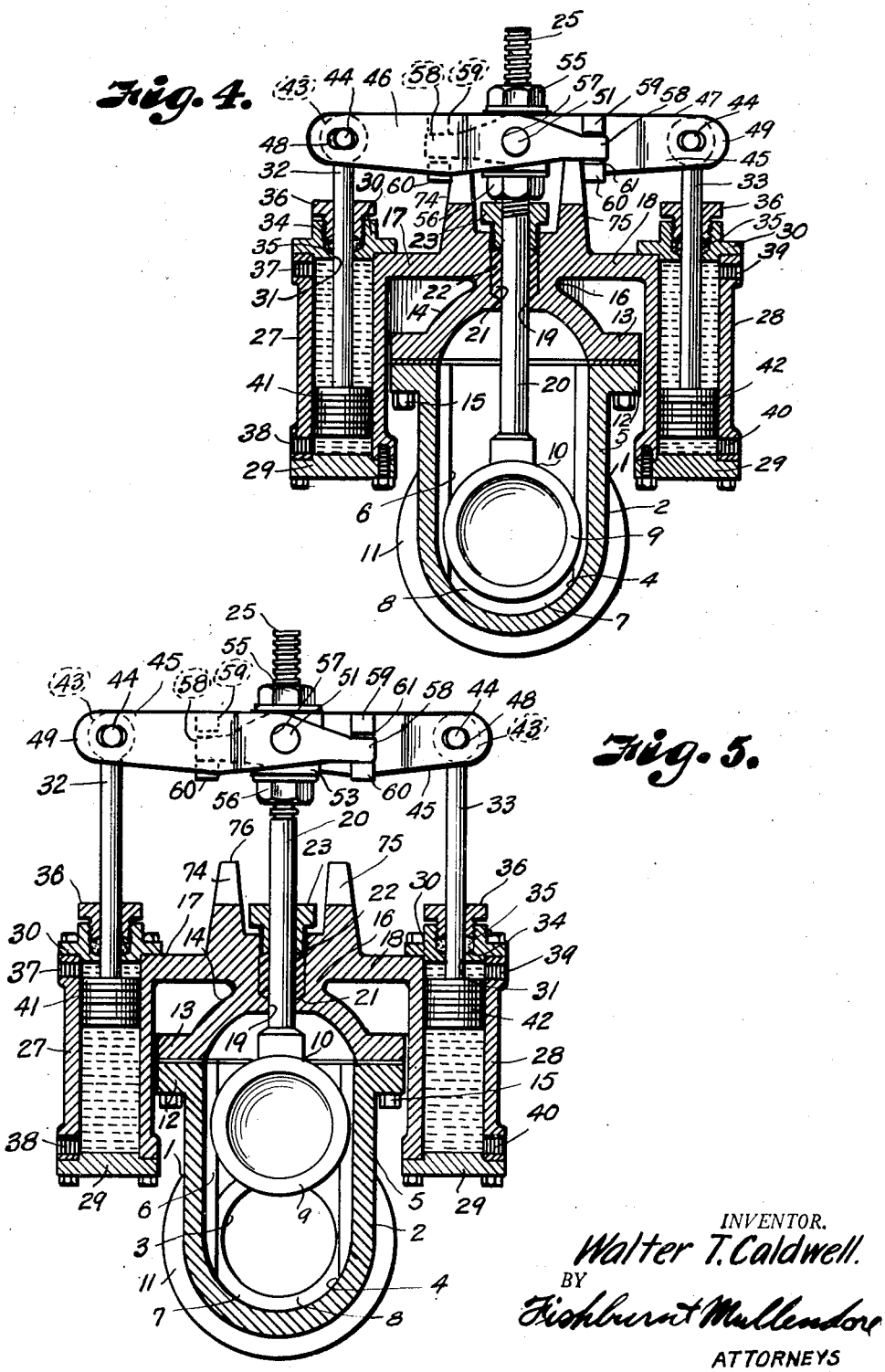

Patented Apr. 11, 1950

2,503,469

UNITED STATES PATENT OFFICE 2,503,469

VALVE AND OPERATING MECHANISM THEREFOR

Walter T. Caldwell, Enid, Okla., assignor, by mesne assignments, to Valve Engineering Company, Enid, Okla., a corporation of Oklahoma Original application March 19, 1942, Serial No. 435,305. Divided and this application April 9, 1945, Serial No. 587,264

12 Claims. (Cl. 137—139)

This invention relates to valves of the type usually known as gate valves, and this application is a division of my copending application on Valve and operating mechanism therefor, filed March 19, 1942, under Serial No. 435,305 and which has since matured into Patent No. 2,386,589, dated October 9, 1945.

Gate valves usually consist of a body having a through passage for flow of fluid which is intercepted by a valving member consisting of a wedge-shaped disk or gate adapted to move transversely to and from wedging contact with opposed seating faces surrounding the flow passage. The seating faces are usually provided on ring inserts of bronze or other material to assure a leak-tight fit when the gate is closed. With this construction considerably more power is needed to unseat the valve than is required to complete the opening movement and effect subsequent closure thereof. Consequently it has been the practice to provide such valves with motive power sufficient to effect unseating of the gate and which power is applied throughout the opening and closing movement with the result that the valve is slow acting and the gate is driven into wedging contact with the seating faces with the same power necessary to effect the starting movement. If sufficient power is provided for higher speed operation the cost of operation increases and the surplus power over that required to complete the opening movement is destructive to the valve, particularly the seat rings thereof, for the reason that the gate is wedged too tightly and the seating faces gall and spring out of shape after a few operations so that the valve begins to leak.

It is, therefore, the principal purpose of the present invention to provide valves of this character with quick-acting mechanisms requiring relatively low operating power and which act in conjunction with a leverage connection with the gate to furnish sufficient starting power for unseating the gate and then quickly opening and closing the gate at a relatively high speed, thereby avoiding excessive wedging of the gate between its seating faces.

Further objects of the invention are to provide a power actuating mechanism adapted for efficient and simple remote control; to provide a power mechanism whereby movement of the valve is under control of the operator; to provide an actuating mechanism capable of application to any standard valve to form a compact unit without materially increasing the over-height of the valve; to provide an operating mechanism whereby the motive forces are applied directly at the valve; and to provide an operating mechanism capable of actuation while submerged in fluids and relatively inaccessible places.

In accomplishing these and other objects of the invention, I have provided improved structure, the preferred form of which is illustrated in the accompanying drawings, wherein:

Fig. 1 is a perspective view of a valve equipped with an operating mechanism embodying the features of the present invention, the hydraulic piping and control valve being illustrated somewhat diagrammatically.

Fig. 2 is a plan view of the valve and operating mechanism therefor.

Fig. 3 is a perspective view of the power increasing levers and the valve stem and piston rod connections shown in disassembled spaced relation to better illustrate the construction thereof.

Fig. 4 is a section through the valve showing the parts in valve closing position.

Fig. 5 is a similar view showing the parts in open position of the valve.

Referring more in detail to the drawings:

1 designates a valve of the gate type and which includes a body 2 having a flow passageway 3 therethrough intercepted by a transverse gate-receiving recess 4 extending upwardly into a laterally extending neck 5 of the valve body and which has opposite sides thereof provided with guides 6. The valve body is provided with seat rings 7 encircling the flow passage on opposite sides of the gate recess. The seat rings are disposed in the valve body so that the seating faces 8 thereof are located in planes converging downwardly to form a wedge contact with correspondingly disposed faces 9 on the gate or valving member 10, as in customary gate valve construction.

The body member of the valve is provided at the ends thereof with suitable means such as flanges 11 for connecting the valve into a pipe line (not shown) to selectively shut off flow of fluid therethrough. The neck 5 of the valve body is provided with a laterally extending annular flange 12 seating a similar flange 13 on a valve bonnet 14 that closes the open top of the gate-receiving recess and which is secured in position by fastening devices 15 extending through the respective valves. The bonnet 14 includes an upwardly extending bracket having a tubular neck portion 16, carrying horizontally extending arms 17 and 18 projecting outwardly beyond the sides of the valve body, for a purpose later described. The neck portion 16 is provided with a bore 19 to accommodate a valve stem 20 connected with the gate or valving member 10, previously mentioned. The upper end of the stem projects through a counterbore 21 containing a packing element 22 that is retained in sealing contact with the stem by a packing gland 23 anchored to the bonnet 14 by swing bolts 24, as in conventional practice. The stem 20 is of sufficient length to project through the packing gland 23 and the terminal end thereof is provided with threads 25 for a purpose later described. Upon reciprocation of the stem, the gate is moved to and from closed position on guides 6 engaging in suitable grooves at the side of the gate. The guides thus prevent slapping of the valve against the seating faces under flow of high pressure fluid through the valve while the valve is being opened and closed.

The valve thus far described is illustrative of any standard gate valve and specifically forms no part of the present invention, the invention being to provide the valve with a gate actuating mechanism, as now to be described.

Carried by the ends of the arms 17 and 18 and depending therefrom along sides of the valve body 2 are cylinders 27 and 28 having their lower ends closed by heads 29. The upper ends of the cylinders are closed by similar heads 30 having openings 31 therein for slidably supporting piston rods 32 and 33 for the respective cylinders. The heads 30 also have counterbores 34 containing packing elements 35 that are retained in sealing contact with the piston rods by glands 36 threaded into the counterbores, as shown in Fig. 4.

Mounted on the lower ends of the rods and slidable in the cylinders between lateral ports 37—38 and 39—40 are pistons 41 and 42. The upper ends of the piston rods are provided with heads 43 having pins 44 fitted therein to pivotally mount the yoke-shaped ends 45 of lever arms 46 and 47, the lever arm 46 being connected with the piston rod 32 and the lever 47 with the piston rod 33. The pins 44 have their ends projecting into elongated openings 48 in the ears 49 and 50 of the yoke-shaped heads of the levers so as to provide free reciprocatory movement of the piston rods when the levers are rocked on pivot pins 51 and 52 that project laterally from a sleeve member 53. The sleeve member 53 has a vertical axial bore 54 for passing the threaded end of the valve stem therethrough and is adjustably positioned on the stem by nuts 55 and 56 threaded on the rod and engaging the respective ends of the sleeve member 53. The pivot pins 51 and 52 extend through openings 57 in the respective levers so that the levers are pivotally connected with the stem and to move therewith when the pistons are reciprocated in their respective cylinders.

In order to limit the extent of pivotal movement of each lever the levers have tail portions 58 engageable between spaced lugs 59 and 60 projecting laterally from the other lever at a point between the valve stem and the yoke-shaped head thereof, the space 61 between the lugs being sufficient to allow limited pivotal movement of the levers on the pivot pins when the pistons reach the limits of their strokes and change direction. Fluid is admitted to the upper ports 37 and 39 from a source of supply by way of a duct 62 having connection with a port 63 in the casing of a four-way valve 64. Fluid is admitted to the lower ports 38 and 40 of the cylinders through a similar duct 65 having connection with a port 66 of the four-way valve 64. Fluid under pressure is alternately admitted to the respective ducts 62 and 65 from a supply pipe 67 connected with a suitable source of pressure supply and liquid is alternately exhausted from the respective ends of the cylinders through a return pipe 68, the pipes 67 and 68 being connected with ports 69 and 70 of the four-way valve. Flow through the four-way valve is controlled by a rotatable core 71, having channels 72 and 73 therein adapted to connect the pipe 67 with the duct 62 when the pipe 68 is connected with the duct 65, and to connect the pipe 67 with the duct 65 when the pipe 68 is connected with the duct 62.

Projecting upwardly from the plate portion 17 of the valve bonnet, on opposite diametrical sides of the packing gland, are lugs 74 and 75, the ends of which form seats or fulcrums 76 adapted to be engaged by the tail portions 58 of the respective levers when the levers are moved upwardly by the pistons to effect opening of the gate. As soon as the levers engage the fulcrums 76 the lifting force of the pressure fluid is supplemented by an increased leverage in an amount according to the relative length of the lever arms from the fulcrum points to the pivot pins 44 and the length from the fulcrum points to the pivot pins 51 and 52. Thus on the initial upward movement of the pistons a substantially greater force is applied to the gate to effect unseating thereof, but as soon as the gate unseats the tail portions of the levers engage the lower lugs 60 which limit further pivotal movement thereof and consequently both levers are moved upwardly as a unit to effect quick opening of the gate. During pivotal movement of the levers, the elongated openings 48 in the ears of the levers allow freedom of movement without binding of the piston rods 32 and 33 in the packing glands 36. When the pistons 41 and 42 reach the upper limit of their stroke, the gate is open, and the parts of the operating mechanism are in the position shown in Fig. 5.

When pressure fluid is admitted to the upper ends of the cylinders 27 and 28, the first movement of the pistons 41 and 42 rocks the outer ends of the levers 46 and 47 downwardly to bring the tail portions 58 thereof against the upper lugs 59 so that further downward movement effects movement of both levers as a unit. It is obvious that the seating force applied to the gate is only that effected by the pressure of the fluid admitted into the upper ends of the cylinders, but when the fluid pressure is admitted into the lower ends of the cylinders the levers exert a multiplied force on the gate to effect unseating thereof, after which the force lifting the valve is only that effected by the pressure medium acting on the pistons. When fluid is being admitted to one end of the cylinders, the fluid in the opposite ends is displaced through the other connection of the four-way valve and returned to the source of supply as will be clearly obvious on inspection of Fig. 1.

From the foregoing it is obvious that I have provided a power actuated mechanism for gate valves whereby the motive force need be only that required to lift the gate under pressure of the fluid flowing through the valve and that the initial unseating force is effected through a leverage mechanism thereby furnishing sufficient power to effect unseating of the gate after which movement of the valve is readily effected through force of the pressure medium alone.

What I claim and desire to secure by Letters Patent is:

1. In an apparatus of the character described, a supporting body, an axially reciprocable stem in said body, a pair of levers, means pivotally mounting the levers on the stem, a lost motion connection between said levers, cylinders at sides of said body, pistons in the cylinders, rods connecting the pistons with the levers, fulcrums carried on said body and engageable by said levers to exert a leverage on said stem, and means for supplying a pressure medium to the cylinders for acting on said pistons.

2. In an apparatus of the character described, a supporting body, an axially reciprocable stem in said body, a pair of levers, means pivotally mounting the levers on opposite sides of said stem, stops on one lever having engagement with the other lever to provide a limited relative movement between the levers, cylinders at the sides of said body, pistons in the cylinders, rods connecting the pistons with the levers, fulcrums carried by the supporting body and engageable by said levers to exert a prying force to move the stem in one direction, and means for supplying a pressure medium to the cylinders for acting on said pistons.

3. In an apparatus of the character described, the combination of a supporting body, an axially reciprocable stem carried by said body, a trunnion member on the stem, trunnions projecting from opposite sides of said member, levers pivoted on the trunnions, a lost motion connection between said levers, cylinders at the sides of said body, pistons in the cylinders, rods connecting the pistons with the levers, fulcrums carried on said body and engageable by said levers to exert a leverage to effect movement of the stem, and means for supplying a pressure medium to the cylinders for acting on said pistons.

4. In an apparatus of the character described, the combination of a supporting body, a stem axially reciprocable with respect to said body, a trunnion member on the stem, trunnions projecting from opposite sides of said member, levers pivoted on the trunnions, stops on one lever having engagement with the other to provide a limited relative movement between the levers, pistons in the cylinders, rods connecting the pistons with the levers, fulcrums carried on said body and engageable by said levers to exert a prying force on said stem in the direction of movement of said stem, and means for supplying a pressure medium to the cylinders for acting on said pistons.

5. In an apparatus of the character described, the combination of a supporting body, a stem axially reciprocable with respect to said body, a trunnion member on the stem, trunnions projecting from opposite sides of said trunnion member, levers pivoted on the trunnions, cylinders at sides of said supporting body, pistons in the cylinders, rods connecting the pistons with the levers, fulcrums carried on said supporting body and engageable by said levers to exert a prying force on the stem in one direction of movement of said stem, and means for supplying a pressure medium to the cylinders for acting on said pistons.

6. In an apparatus of the character described, the combination of a cylinder support, a stem axially reciprocable through the cylinder support, a trunnion member on the stem, trunnions projecting from opposite sides of said trunnion member, levers pivoted on the trunnions, a lost motion connection between said levers, cylinders depending from the cylinder support on opposite sides of the stem, pistons in the cylinders, rods connecting the pistons with the levers, fulcrums carried by the cylinder support and engageable by said levers to exert a prying force on the stem for starting movement of said stem, and means for supplying a pressure medium to the cylinders for acting on said pistons.

7. A power mechanism adapted for operation of an axial reciprocable member, a cylinder support, cylinders carried by the support, pistons in the cylinders, rods connected with the pistons, levers having ends connected with said rods, fulcrums on the cylinder support adapted to be engaged by said levers, a lost motion connection between said levers, and means for pivotally connecting the levers with the reciprocable member.

8. In an apparatus of the character described, the combination of a supporting body, a stem axially reciprocable with respect to said supporting body, a trunnion member on the stem, levers pivoted intermediately of their ends on the trunnion member at opposite sides of the stem, spaced stops on one end of each lever having engagement with upper and lower edges of the opposite end of the other lever to provide a limited relative movement between the levers, pistons in the cylinders, rods connecting the pistons with said opposite ends of the levers, fulcrums carried by the supporting body and engageable with the ends of said levers having the stops to exert a prying force on the stem for starting movement of the stem, and means for supplying a pressure medium to the cylinders for acting on said pistons.

9. An actuating unit for a reciprocable member, including a trunnion member for attachment on the reciprocable member, trunnions projecting from opposite sides of said trunnion member, levers pivoted on the trunnions, a lost motion connection between said levers, cylinders, means for supporting the cylinders at opposite sides of the reciprocable member, pistons in the cylinders, rods connecting the pistons with the levers, fulcrums carried by the cylinder supporting means and engageable by said levers to exert leverage to effect movement of the reciprocable member in one direction, and means for supplying a pressure medium to the cylinders for acting on said pistons.

10. An actuating unit for a reciprocable member, a trunnion member for attachment to the reciprocable member, levers pivoted on the trunnion member at opposite sides thereof, a lost motion connection between said levers, cylinders, means for supporting the cylinders at opposite sides of the reciprocable member, pistons in the cylinders, rods connecting the pistons with the levers, fulcrums carried by the cylinder support and engageable by said levers to exert a prying force on the reciprocable member when the reciprocable member is moved in one direction, and means for supplying a pressure medium to the cylinders for acting on said pistons.

11. An operating unit including a bonnet adapted for attachment to a gate valve, a stem axially reciprocable in the bonnet, a trunnion member adapted for connection with the stem, levers pivoted on opposite sides of the trunnion member, a lost motion connection between said levers, cylinders suspended from opposite sides of the bonnet, pistons in the cylinders, rods connecting the pistons with the levers, fulcrums carried by the bonnet and engageable by said levers to exert a prying force on the stem to effect starting movement of the stem in one direction, and means for supplying a pressure medium to the cylinders for acting on said pistons.

12. An operating unit for a gate valve, including a bonnet, a stem axially reciprocable in the bonnet, a plate-like support carried on the bonnet, a trunnion member adapted to be attached to the stem, levers pivoted on the trunnion member, a lost motion connection between said levers, cylinders suspended from the plate-like support at the sides of the bonnet, pistons in the cylinders, rods connecting the pistons with the levers, fulcrums projecting from the plate-like support and engageable by said levers to exert a prying force to effect starting movement of the stem in one direction, and means for supplying a pressure medium to the cylinders for acting on said pistons.

WALTER T. CALDWELL.

REFERENCES CITED

The following references are of record in the file of this patent:

UNITED STATES PATENTS

| Number | Name | Date |
|---|---|---|
| 335,112 | De Kinder | Feb. 2, 1886 |
| 1,959,071 | Van Patter | May 15, 1934 |
| 2,386,589 | Caldwell | Oct. 9, 1945 |